United States Patent [19]

Canedi

[11] Patent Number: 5,240,038

[45] Date of Patent: Aug. 31, 1993

[54] SURFACE TENSION TANK WITH MULTIPLE DELIVERY RATES

[75] Inventor: Frédéric Canedi, Chaumont en Vexin, France

[73] Assignee: Societe Europeenne de Propulsion, Suresnes, France

[21] Appl. No.: 909,711

[22] Filed: Jul. 7, 1992

[30] Foreign Application Priority Data

Jul. 8, 1991 [FR] France .................. 91 08549

[51] Int. Cl.$^5$ ............................................. B64D 37/08
[52] U.S. Cl. ................................... 137/574; 137/590
[58] Field of Search .................... 137/574, 590, 154

[56] References Cited

U.S. PATENT DOCUMENTS

| | | | |
|---|---|---|---|
| 2,884,937 | 5/1959 | Myers, Jr. | 137/590 X |
| 3,202,160 | 8/1965 | Barger | 137/590 X |
| 4,168,718 | 9/1979 | Nesseta | 137/590 X |
| 4,399,831 | 8/1983 | Robert | 137/590 X |
| 4,489,745 | 12/1984 | Netter et al. | 137/590 X |
| 4,553,565 | 11/1985 | Kerebel | 137/590 |
| 4,595,398 | 6/1986 | Orton et al. | 55/182 |
| 4,715,399 | 12/1987 | Jaekle, Jr. et al. | 137/590 X |
| 4,733,531 | 3/1988 | Grove | 137/590 X |
| 4,743,278 | 5/1988 | Yeh | 137/154 |
| 4,768,541 | 9/1988 | Uney et al. | 137/590 X |
| 4,901,762 | 2/1990 | Miller et al. | 137/574 |

FOREIGN PATENT DOCUMENTS 0367001 10/1989 European Pat. Off. .
2254494 12/1974 France .
8803499 5/1988 World Int. Prop. O. .

*Primary Examiner*—John Rivell
*Attorney, Agent, or Firm*—Staas & Halsey

[57] ABSTRACT

The surface tension tank is designed to feed a liquid propellant to a main engine and to at least one auxiliary engine or receiver of a space vehicle or satellite. The tank comprises a common shell containing at least two compartments of different sizes that are separated by a diaphragm provided with at least one strainer for providing communication between the large compartment and the small compartment. A pressurization gas feed orifice opens out into the large compartment. A liquid expulsion device is placed in the small compartment, and means for delivering liquid to the members to be fed are essentially disposed along a direction that differs little from the direction of the main acceleration imparted by the main engine, in such a direction as to accelerate liquid flow therealong. Means provided with at least one outlet strainer constitute a gas barrier and are provided for removing at least a substantial fraction of the liquid contained in the large compartment directly to the liquid delivery means without the liquid transitting through the small compartment, such that the tank makes it possible to obtain a maximum liquid outlet flow rate that may be about 100 times the minimum authorized flow rate.

17 Claims, 12 Drawing Sheets

SURFACE TENSION TANK WITH MULTIPLE DELIVERY RATES

FIELD OF THE INVENTION

The present invention relates to a tank for storing a pressurized liquid for use in space vehicles or satellites to feed engines and other liquid receivers at various flow rates adapted to each receiver, and more specifically in weightlessness, making use of the separation force that is produced by surface tension to collect the liquid contained inside the tank in certain privileged zones.

More specifically, the invention relates to a surface tension tank having multiple delivery flow rates, for operation under microgravity in space vehicles or satellites for feeding a main engine and at least one auxiliary receiver or engine with a liquid propellant, the tank comprising a common shell housing at least two compartments of different dimensions which are separated by at least one first diaphragm provided with at least one strainer providing communication between the larger-sized compartment and the smaller-sized compartment, a pressurization gas feed orifice being provided through the shell to open out into the large compartment, a liquid expulsion device being placed in the small compartment, and means for delivering liquid to the members to be fed being essentially disposed in a direction that differs little from the main acceleration direction imparted by the main engine, so that liquid is accelerated therealong.

PRIOR ART

Various types of tank are known for storing a liquid, in particular a propellant, into which an inert pressurizing gas is injected to enable the liquid to be expelled towards members that make use of it, in particular propulsion engines within space vehicles such as satellites operating in weightlessness.

In such applications, it is particularly important for the engines to be fed with liquid propellants that are free from gas. It is particularly difficult to collect a liquid under conditions of weightlessness towards the end of tank-draining when there remains a relatively small quantity of liquid in the tank with the pressurization inert gas occupying a large portion of the initial volume.

Liquid expulsion devices provided in tanks that operate in weightlessness already exist for remedying this problem. Those devices make it possible in weightlessness to draw off the liquid contained in the tank regardless of where the liquid is located. Those devices make use of surface tension forces which become predominant under microgravity. These forces entrain the liquid into zones where the walls are closer together and where the shapes of the liquid/gas interfaces are such as to minimize their areas.

Depending on the intended application, such tanks and devices for expelling the liquid contained therein may take up various different forms.

Thus, Document GB-A-2 170 163 discloses a tank enclosing a spherically-shaped liquid expulsion device provided with openings fitted with sieves that act as gas barriers because of the surface tension effect.

Another tank of the same type and fitted internally with liquid expulsion devices is described in Application WO 88/03499. Each of the tanks of the apparatus includes a device that makes use of the surface tension effect to prevent gases escaping from the tank while there remains liquid that could be delivered by the tank. Each of the devices described in that document is constituted by two circular perforated plates covered with a strainer constituted by a mesh, the device being placed close to the liquid outlet orifice.

In all of the above examples, the tanks have the feature of obtaining a given flow rate of liquid under weightlessness, and in particular of delivering a liquid that is free from gas.

For a tank or storage compartment that is large and intended to deliver a propellant at a high rate of flow, the liquid expulsion device that makes use of surface tension phenomena must have corresponding dimensions. Unfortunately, any device for expelling liquid includes a certain residual volume of liquid that cannot be drawn off. The inaccessible residual volume constitutes an unused mass of propellant, and the larger the liquid expulsion device, the greater said mass.

In satellites, it is generally necessary to provide for feeding a plurality of engines with propellants at different flow rates, and therefore to provide tanks or tank compartments of different sizes.

In particular, the engine that is used for the orbit-placing apogee maneuver requires high head losses and must be fed at a high flow rate from a tank of large size, while the engine used for correcting the attitude of a satellite that is in orbit may be smaller in size and may be fed at a lower rate.

In operation, each propellant flow is associated with a fixed maximum duration during which propellant is to be supplied on any one occasion, and a fixed maximum duration for a pause between two successive occasions on which fuel is taken. Account is taken of the acceleration imparted to the vehicle when large flow rates are taken.

Proposals have already been made to feed different engines (or other receivers that require different flow rates) from a plurality of separate tanks (optionally separated by partitions) which, for small flow rates, are provided with respective normal liquid expulsion devices (DELs), which may be made, for example, by applying the teaching of Documents EP-A-0 043 777 and EP-A-0 042 784. The tanks for delivering high flow rates are fitted with respective large DELs that give rise to a mass penalty and to a dead volume penalty, or else they are provided with a pressurized bag, such as that described in Documents U.S. Pat. No. 3,592,360 or U.S. Pat. No. 3,933,448, for example.

In order to avoid using a large DEL or a bag for a large flow rate tank under nominal conditions, proposals have also been made to direct the outlet pipework from tanks that are for high flow rates at least approximately parallel to the acceleration vector imparted to the vehicle so that fuel is accelerated therealong. Such a solution nevertheless requires a full auxiliary tank for the purpose of starting acceleration, or some other means such as a battery of solid fuel microrockets, for example.

Proposals are also made in Document GB-A-2 109 760 to provide a fuel tank that is generally spherical in shape whose inside space is divided into two compartments by a conical part having an end that includes a fine-mesh sieve that provides communication between the two compartments. The compartment situated adjacent to the liquid outlet is provided with a liquid expulsion device. Such a two-compartment tank has a single pressurization device and may be filled using a single filling device. Nevertheless, all of the liquid contained in the upper compartment must pass through the DEL-fitted lower compartment which means that since the single liquid outlet is connected to the lower compartment only, it does not enable flow rates to be adjusted over wide ranges of values.

OBJECT AND BRIEF SUMMARY OF THE INVENTION

The present invention seeks to remedy the above-mentioned drawbacks and to provide a single propellant storage tank that is simple in structure and which makes it easy to adjust the liquid delivery flow rate to engines having very different requirements, and to make maximum use of the entire volume of propellants stored in the tank.

According to the invention, this object and others are achieved by means of a surface tension tank having multiple delivery flow rates, for use in operation under microgravity in space vehicles or satellites for feeding a main engine and at least one auxiliary receiver or engine with a liquid propellant, the tank comprising a common shell housing at least two compartments of different dimensions which are separated by at least one first diaphragm provided with at least one strainer providing communication between the larger-sized compartment and the smaller-sized compartment, a pressurization gas feed orifice being provided through the shell to open out into the large compartment, a liquid expulsion device being placed in the small compartment, and means for delivering liquid to the members to be fed being essentially disposed in a direction that differs little from the main acceleration direction imparted by the main engine, so that liquid is accelerated therealong. The tank includes means provided with at least one outlet strainer forming a gas barrier for delivering at least a substantial portion of the liquid contained in the large compartment directly to the liquid delivery means without the liquid transitting via the small compartment, such that the tank allows liquid to be taken directly both from the large compartment and from the small compartment, thereby defining a maximum liquid outlet flow rate which may be about 100 times the minimum authorized flow rate.

It may be observed that the effective liquid delivery flow rate depends mainly on the acceleration component of the vehicle along the outlet pipework, and also on the head losses due to the receivers being fed.

The independence of the large compartment relative to the small compartment with respect to their devices for removing liquid means that the diameter of the outlet strainer and the diameter of the outlet tube for delivering liquid from the large compartment may be large in size so that they then play a role that is entirely secondary in dimensioning the flow rate.

According to the invention, the large compartment does not include an over-dimensioned DEL, and only a small backup partial DEL may be required under some circumstances for use in compensating acceleration being inclined relative to the means for delivering liquid and for feeding the main engine when it starts to operate.

The bubble points of the outlet strainers from the compartments enable them to function as gas barriers.

The strainers for communication between compartments are themselves designed to avoid or to limit any return flows of propellant from a small compartment towards a large compartment, while nevertheless allowing the small compartment to be fed with propellant and to be pressurized. The small compartment may be topped up with the liquid contained in the large compartment as required, thereby providing a large amount of flexibility at no additional cost.

The tank of the invention can be embodied in various different ways, as described below.

In a first possible embodiment, the tank includes a first outlet tube approximately diametrically opposite to the pressurization gas feed orifice and serving to deliver liquid directly from the large compartment.

Under such circumstances, the tank may include a second outlet tube disposed coaxially about the first outlet tube to deliver liquid directly from the small compartment via an annular passage itself provided with a strainer constituting a gas barrier.

The smaller section first outlet tube may open out into the second outlet tube which subsequently feeds all of the receivers via branch connections, or the two outlet tubes may be connected to independent sets of pipework. If so, since each compartment has its own outlet pipework connected to one or more receivers, it is possible to accumulate supplies of propellants specific to each use by means of capillarity.

In another possible embodiment, the tank includes an outlet passage provided with a strainer constituting a gas barrier for delivering liquid from the small compartment, which outlet passage is offset relative to the first outlet tube and is directly connected to pipework that is independent from the pipework connected to the first outlet tube.

In yet another embodiment, the tank includes an outlet passage provided with outlet strainers forming gas barriers and serving to deliver liquid from the small compartment, which outlet passage opens out into a receptacle which is itself in communication with the first outlet tube.

In yet another embodiment, the tank includes a first outlet tube for direct delivery of liquid from the large compartment via an annular collector disposed in a boundary zone between the large compartment and the small compartment within the lower fourth of the tank opposite from the pressurization gas feed orifice.

Said first diaphragm may be essentially situated in a plane perpendicular to the axis of symmetry of the tank, which axis passes through the pressurization gas feed orifice.

In which case, the first diaphragm may be plane or it may be curved in shape with its convex side facing the small compartment.

When an outlet tube begins in an annular collector, the first diaphragm is frustoconical in shape with its small base facing towards the large compartment, the strainer providing communication between the large compartment and the small compartment being itself disposed in the central portion of the first diaphragm at the small base.

In an advantageous embodiment, the outlet strainer forming a gas barrier for delivering the liquid contained in the large tank is situated in the central portion of the first diaphragm, while the strainer providing communication between the large compartment and the small compartment is disposed in an annular zone of the first diaphragm situated at a distance from said central portion.

The invention also provides a tank comprising a second diaphragm parallel to said first diaphragm, the first and second diaphragms defining between them said small compartment which is provided with a liquid expulsion device, while the second diaphragm together with the end wall of the tank in which the liquid delivery means are disposed also defines an additional compartment of small size having no liquid expulsion device and constituting a priming tank specific to the high flow rate, the second diaphragm being provided with at least one strainer for providing communication between the small compartment and the additional small compartment, and the first outlet tube passing through both the small compartment and the additional small compartment without communicating therewith.

In which case it is preferable for communication tubes having axes perpendicular to said first and second diaphragms to be placed between the large compartment and the additional small compartment, and for a strainer to be placed at at least one of the ends of each of said tubes.

In addition, in a possible variant embodiment, communication tubes extending perpendicularly to said first and second diaphragms are placed between the small compartment and the liquid delivery means, and are provided with strainers forming gas barriers to enable the liquid contained in the small compartment to be delivered directly to the liquid delivery means.

The first diaphragm may also be situated essentially in a plane that is parallel to the axis of symmetry of the tank and that includes the pressurization gas feed orifice.

Under such circumstances, in a particular embodiment of the invention, the outlet strainer constituting a gas barrier for delivering the propellants contained in the large tank is situated in a collector whose outlet opens out into the first outlet tube while the strainer providing communication between the large compartment and the small compartment is disposed in the first diaphragm.

BRIEF DESCRIPTION OF THE DRAWINGS

Other characteristics and advantages of the present invention appear more clearly on reading the following description made with reference to the accompanying drawings, in which.

DETAILED DESCRIPTION OF PARTICULAR EMBODIMENTS

Figure 1:
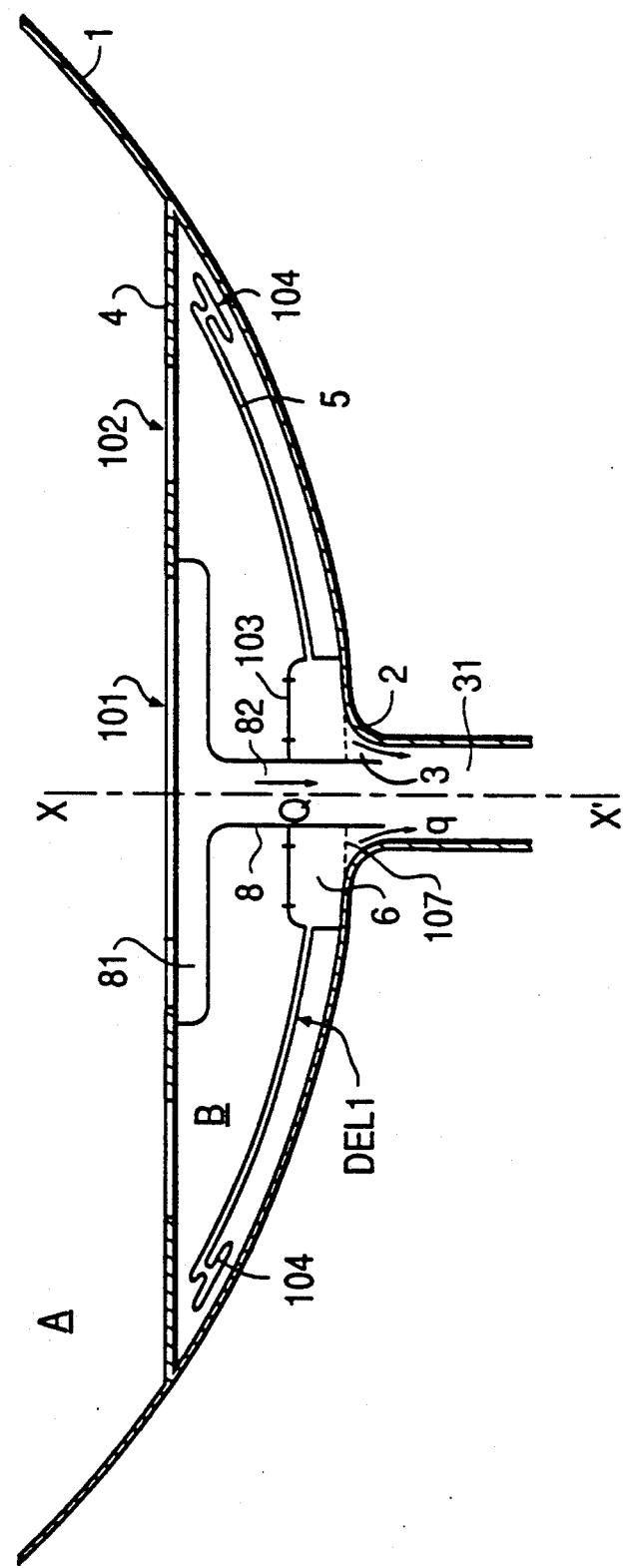
FIG. 1 is an axial section through a portion of a tank constituting a first embodiment of the invention and comprising two storage compartments for a liquid propellant together with a separating diaphragm extending transversely relative to the main outlet orifice.

FIG. 1 is an axial section through the zone of a tank 1 of the invention that is situated close to its liquid outlet.

The tank preferably has an axis of symmetry XX' corresponding to the axis of liquid outlet tubes 82, 31 defining liquid delivery means. This axis is also the main acceleration axis $G_Q$ when high flow rates are being taken off.

A first separating diaphragm 4 extending perpendicularly to said axis is fixed around its periphery to the inside wall of the shell of the tank 1, thereby delimiting a first compartment A of large size and a second compartment B of small size. The diaphragm 4 includes a plurality of orifices each covered by a strainer 101, 102, i.e. by a mesh. In the embodiment of FIG. 1, one of the orifices is circular and centered on the axis of symmetry XX' of the tank, and is provided with a large diameter strainer whose mesh size is small, such that said strainer passes liquid at high flow rates. This disposition of the strainer 101 is adapted to the fact that when high flow rates are being taken, the acceleration must lie on the axis of the outlet tube in the absence of any device for expelling liquid from the compartment A.

A receptacle 8 is disposed beneath the strainer 101, and comprises a circular portion 81 of diameter slightly greater than that of the strainer 101, together with a tubular portion 82 that is coaxial about the axis XX', and that constitutes the liquid outlet for a high flow rate Q. This tubular portion 82 preferably extends beyond the end of the tank 1.

A second strainer 102, e.g. in the form of an annulus centered on the axis of symmetry XX' of the tank, is fixed over a second orifice through the first diaphragm 4. The mesh size of the second strainer 102 may be larger than that of the first strainer 101, and the strainer 102 is used for providing communication between the compartments A and B of the tank. The second strainer 102 may equally well be subdivided into a set of small strainers distributed around the first strainer 101.

Since the first diaphragm 4 is situated relatively close to the liquid delivery means 2, a large compartment A is formed which is used more specifically during the stage of reaching final orbit, i.e. for the purpose of feeding large engines that require a high flow rate. The second compartment B is smaller than the first compartment A and serves more specifically to feed small engines that only require a small flow rate.

The second compartment B is advantageously fitted with a first liquid expulsion device DEL1 constituted, for example, in conventional manner by a set of tubes 5 each running over the shell and disposed in a star configuration about a zone 6 (gas trap) close to the outlet zone 2 and extending to strainers 104 situated as close as possible to the inside wall of the tank 1 and also interconnected by strips, thereby improving the way liquid flow is governed by capillarity.

The central zone 6 which constitutes a gas trap is a kind of box overlying the outlet zone 2 from which the tubes 5 project, and it is provided on its top surface parallel to the separating diaphragm 4 with a third strainer 103 that may be in the form of a circular ring overlying a sheet having holes therethrough. This third strainer 103 preferably passes liquid at all flow rates.

Finally, and optionally, another outlet strainer 107 may be provided in the annular gap 3 between the tubular portion 82 and the outer outlet tube 31 which co-operates with the tubular portion 82 in the outlet zone 2 from the tank to define an annular passage for a small flow rate q coming from the small compartment B. This strainer 107 provides additional safety by preventing bubbles leaving during certain operating stages only.

The flow rates obtained depend essentially firstly on the head losses due to the receivers connected to the tank, and secondly, at high flow rates, to the acceleration to which the satellite or space vehicle is subjected along the axis of the outlet tube.

Figure 2:
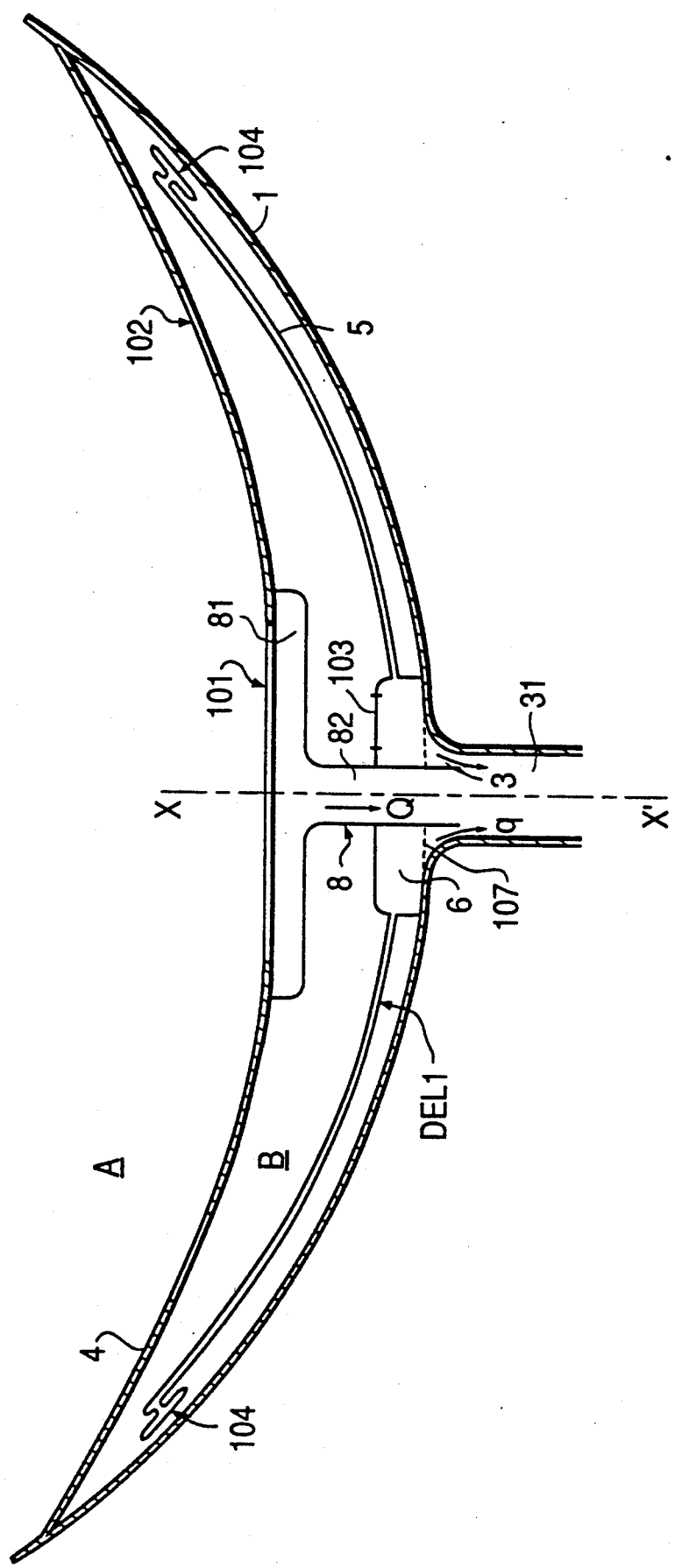
FIGS. 2 to 5 are respective axial sections through a portion of various embodiments of a tank of the invention having a single diaphragm extending transversely relative to the main outlet orifice and designed for use with high liquid flow rates.

FIG. 2 shows a second embodiment of the invention which differs from the above embodiment solely in the shape of the diaphragm 4 which is no longer plane, but which is curved, e.g. conical or concave. This shape serves to establish privileged locations for drawing off liquid. Since the other items in this embodiment are the same as in the embodiment of FIG. 1, they are not described further herein.

Figure 3:
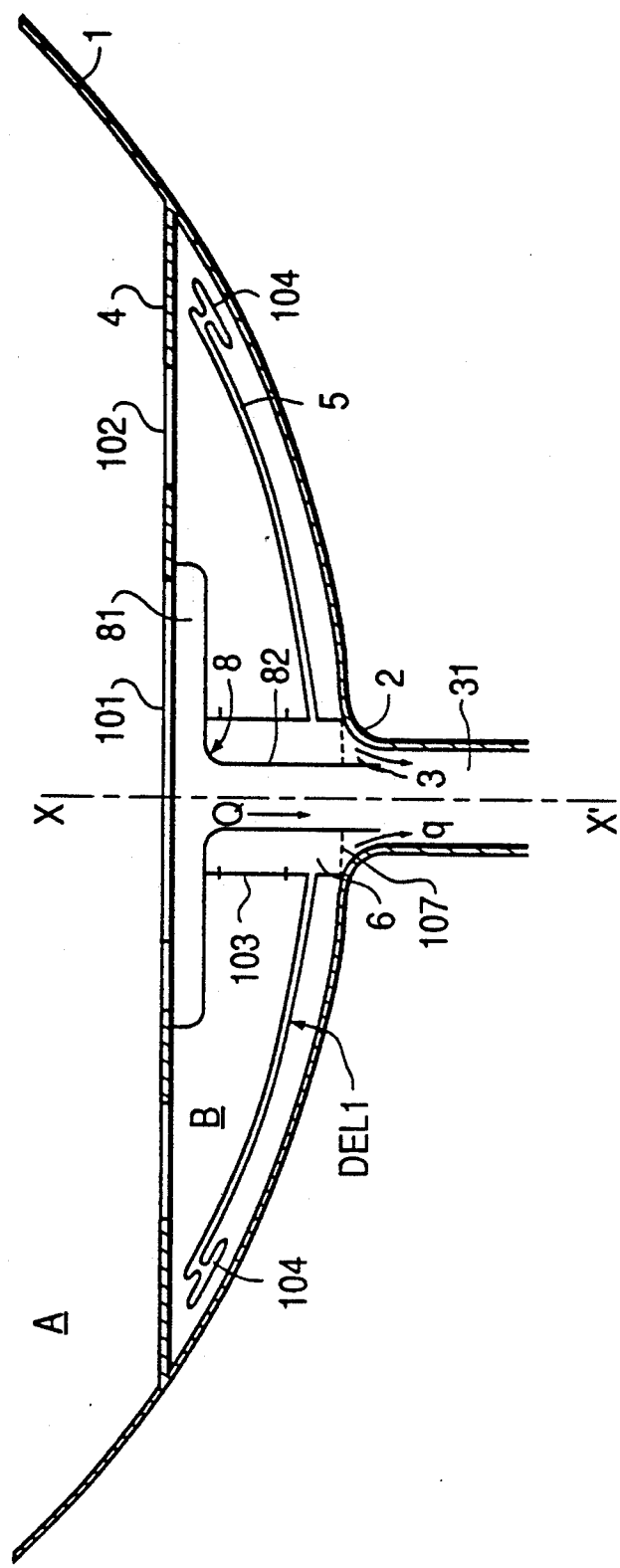

FIG. 3 shows an embodiment of the invention that differs from that of FIG. 1 only in the way the third strainer 103 is disposed, which strainer is tubular in this case, surrounding the tubular portion 82 coaxially. The third strainer 103 may extend in one or more portions over the circumference of a tubular portion that is coaxial with the portion 82, and which extends from the bottom face of the circular portion 81 to the outlet zone 2 of the tank. The other portions in this embodiment, and in particular the liquid expulsion device DEL1, are similar to those of the embodiment in FIG. 1. This disposition increases the flow section for the low flow rate q passing in part through the strainer 103.

Figure 4:
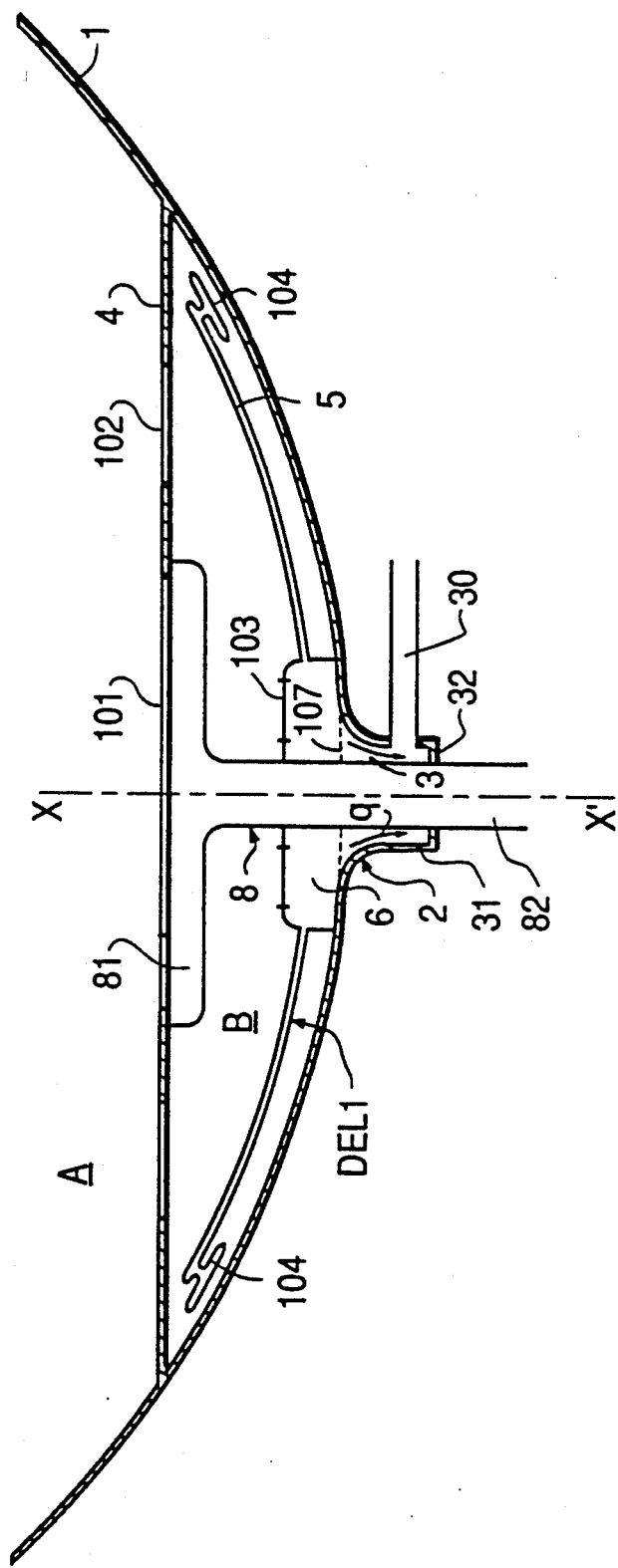

FIG. 4 shows a variant of FIG. 1 which differs in that it has a branch 30 connected to the outer outlet tube 31 which surrounds the tube 82 to define an annular passage 3, which outer tube 31 does not extend as far as the inner tube 82 from the outlet of the tank. The outlet tube 31 is closed by an end wall 32 shortly after the outlet zone 2 from the tank, and the branch 30 therefrom extends along an axis perpendicular to the axis XX' of the tube 31 and opens out into the tube 31 between the end wall 32 and the outlet zone.

Figure 5:
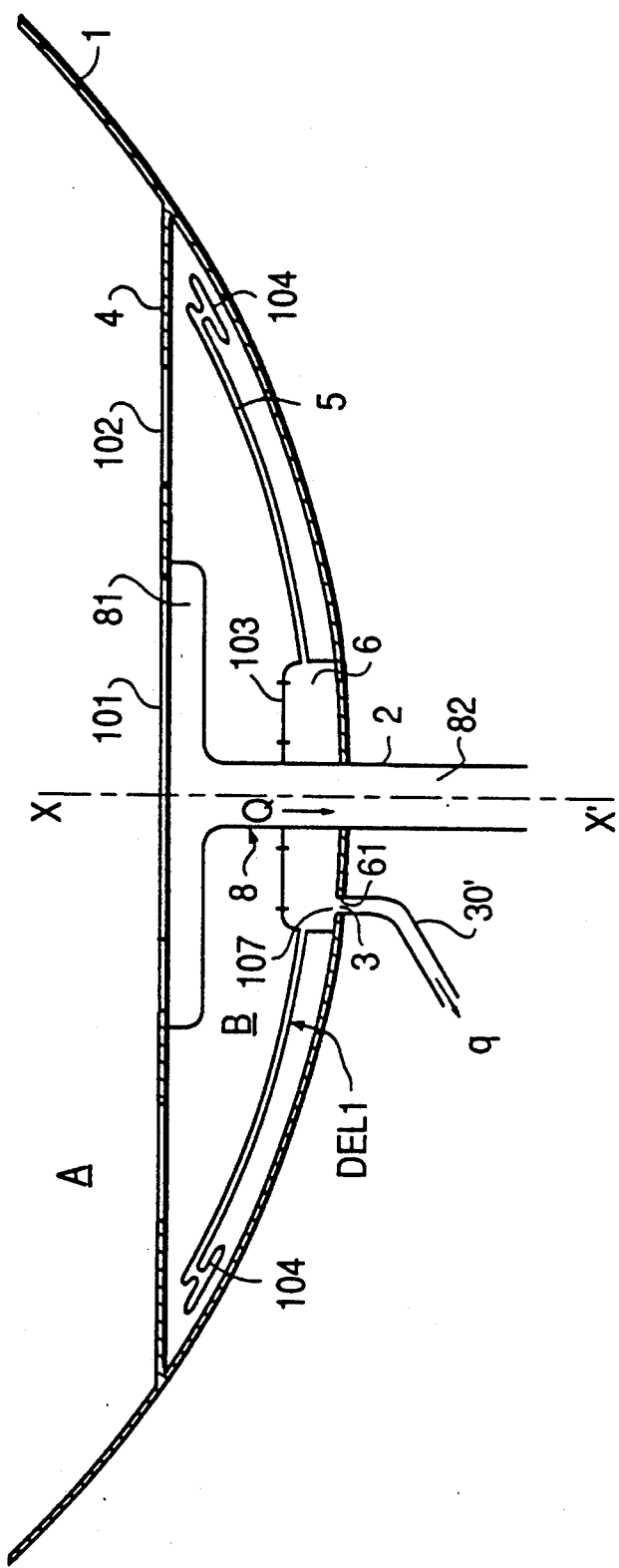

FIG. 5 shows an embodiment close to the preceding embodiment in that the sole difference compared with the embodiment of FIG. 1 lies in the fact that the two outlet tubes 82 and 30' are not coaxial. The outlet tube 82 corresponding to the high flow rate Q is rectilinear and on the axis XX', while the passage 3 corresponding to the low flow rate q is not defined by the outer tube 31 but by a small outlet tube 30' that runs from the end wall of the tank 1, that is parallel to the axis XX' over a portion of its length only, and that is then bent to extend finally along a portion that is at an obtuse angle with the portion parallel to the axis XX'. A plurality of small diameter tubes such as 3' can thus open out into the central zone 6 or box in order to increase the number of low rate flows.

The last two embodiments to be described relate to tanks having multiple and non-concentric outlet orifices, and they enable similar flows to be obtained in the tubes serving for the high flow rate Q and for the low flow rate q.

Figure 6:
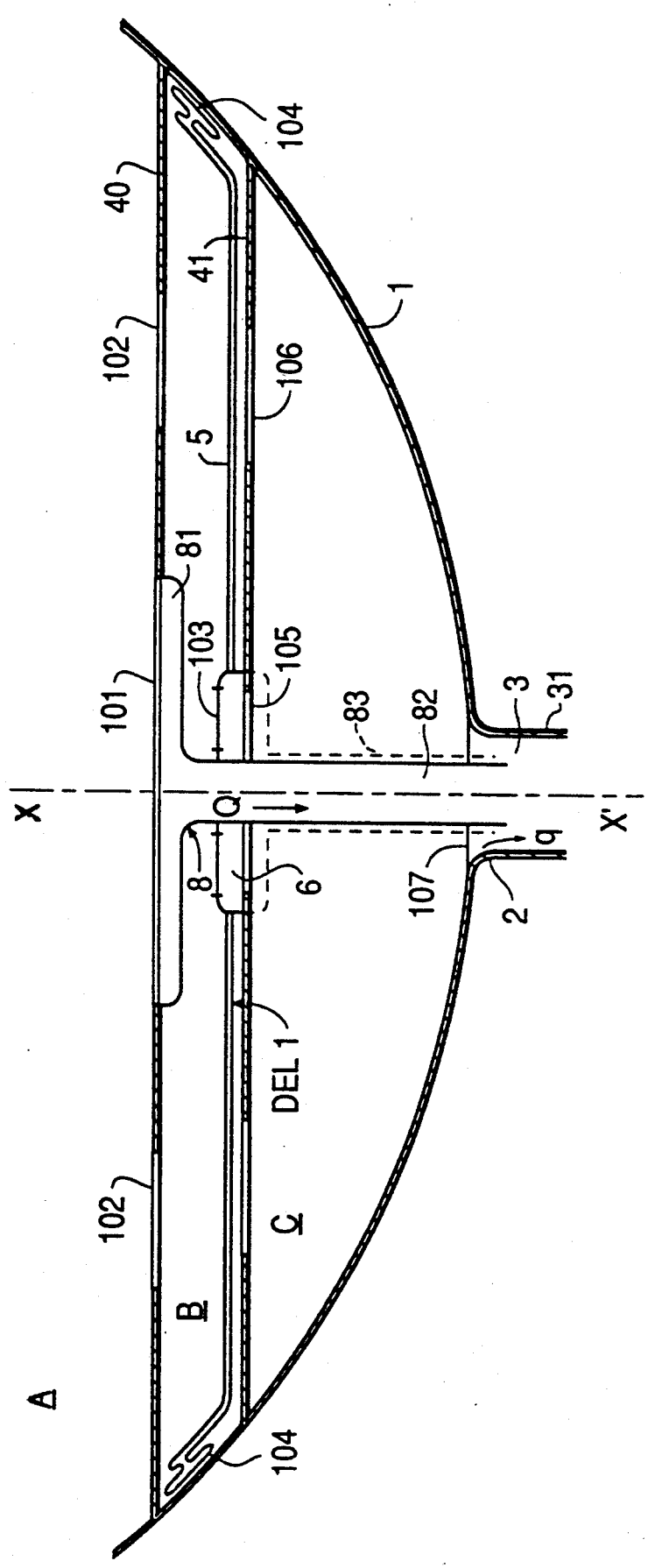
FIGS. 6 and 7 are axial sections through a portion of a tank of the invention that includes two separating diaphragms for the purpose of defining a small additional compartment for priming high rates of flow.
Figure 7:
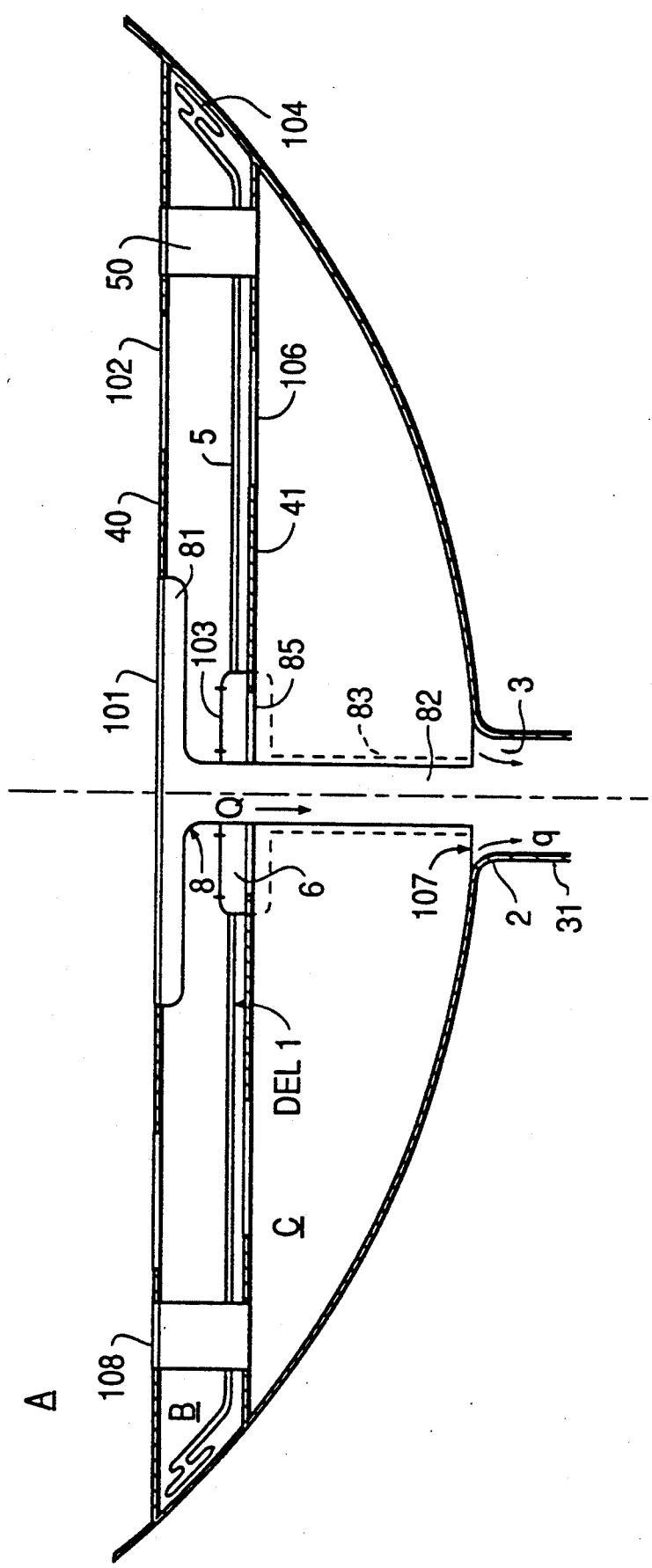

FIGS. 6 and 7 relate to a tank of the type mentioned at the beginning of the description and comprising three compartments A, B, and C delimited by two separating diaphragms 40 and 41.

Plane diaphragm 40 extending perpendicularly to the axis XX' is the further from the outlet zone 2 and thus co-operates with the inside wall of the tank furthest from the outlet 2 to delimit the largest compartment A.

The second compartment B is delimited by said diaphragm 40, by a second diaphragm 41 parallel to the first diaphragm, and by the inside wall of the tank 1 where it extends between the two diaphragms 40 and 41.

Finally, the third compartment C is defined between said second diaphragm 41 and the end wall of the tank in which the outlet 2 is formed.

In a non-limiting example, a plurality of communication strainers are placed over orifices and/or perforated sheets associated with the diaphragms, and with at least one liquid expulsion device DEL placed in one of the compartments.

First and second strainers 101 and 102 as described with reference to the preceding embodiments may be placed over the first diaphragm 40. Similarly, third and fourth strainers 103 and 104 may be fixed as described above in a liquid expulsion device placed in compartment B, for example, such that the third strainer 103 overlies a central zone 6' through which there passes the tubular portion 82 for draining high flow rates of liquid from the compartment A.

The second diaphragm 41 may advantageously be provided with ring-shaped fifth strainer 105 surrounding the column 82, and there may also be provided a sixth strainer 106, e.g. in the form of a circular ring centered on the axis XX' and of larger radius than the ring 105.

Finally, a seventh strainer 107 may be placed in the outlet zone 2 in the annular gap 3 between the outlet tube 31 and the column 82 for extracting high flow rates Q. Small flow rates q pass through this strainer 107 which is required only when the liquid contained in the third compartment C is being used, i.e. when the other two volumes have already been emptied of liquid.

A variant of this embodiment is shown in FIG. 7 where communication tubes 50 are shown placed between the first and second diaphragms 40 and 41. These tubes 50 have axes perpendicular to the planes of the diaphragms 40 and 41 and each of them is provided at at least one end with a strainer 108.

This disposition makes it possible to empty the first compartment A more completely and thus to operate at a high flow rate Q prior to emptying the second compartment B.

FIGS. 6 and 7 also show in dashed lines a central tube 83 surrounding the central tube 82 and providing direct communication between the second compartment B and the outlet zone C without requiring liquid to transit via the third compartment C.

In variants, the diaphragms 40 and 41 of the two embodiments described above could be curved instead of being plane.

Three volumes (or compartments) A, B, and C in the tank are used as follows:
  volume A is used for adjusting and changing orbit;
  volume B is used for correcting attitude (in microgravity); and
  volume C which is filled initially and which is subsequently filled by the accelerations for changing orbit is used for priming a high flow rate by making it possible to urge propellants towards the outlet 2 of the tank, where upon high flow rates can be obtained from the volume A.

Such a tank makes it possible, in particular, to return to using a high flow rate after attitude corrections, i.e. it makes large changes in flow rate possible in either direction.

Various modifications and additions may be applied to the embodiments described above.

Thus, FIG. 6 shows a tube 82 for expelling liquid from the compartment A that penetrates a short distance into the outlet tube 3 from the tank, i.e. beyond the strainer 107, whereas in FIG. 7, the same tube 82 is shown as terminating at the strainer 107. These characteristics could naturally be interchanged. Thus, the tube 82 in FIG. 7 could likewise extend beyond the strainer 107, or the tube 82 in FIG. 6 could likewise terminate at the strainer 107.

The tank of the invention can be used with various different types of propellant, for example single component fuels such as hydrazine $N_2H_4$, two component fuels such as monomethylhydrazine (MMH), nitrogen peroxide ($N_2O_2$), and even cryogenic components such as hydrogen and oxygen, providing thermal protection is available. However, implementations of tanks of the invention are particularly adapted to two-component systems that may require high flow rates.

As already mentioned, the tank(s) of the invention must be placed essentially on the main acceleration axis. To enable proper operation of the propellants in the tank(s) and to avoid delivering gas on starting, it suffices merely to place each tank on the launch platform in such a manner that the outlet from the tank is as far as possible from the instantaneous center of rotation of the platform.

Figure 8:
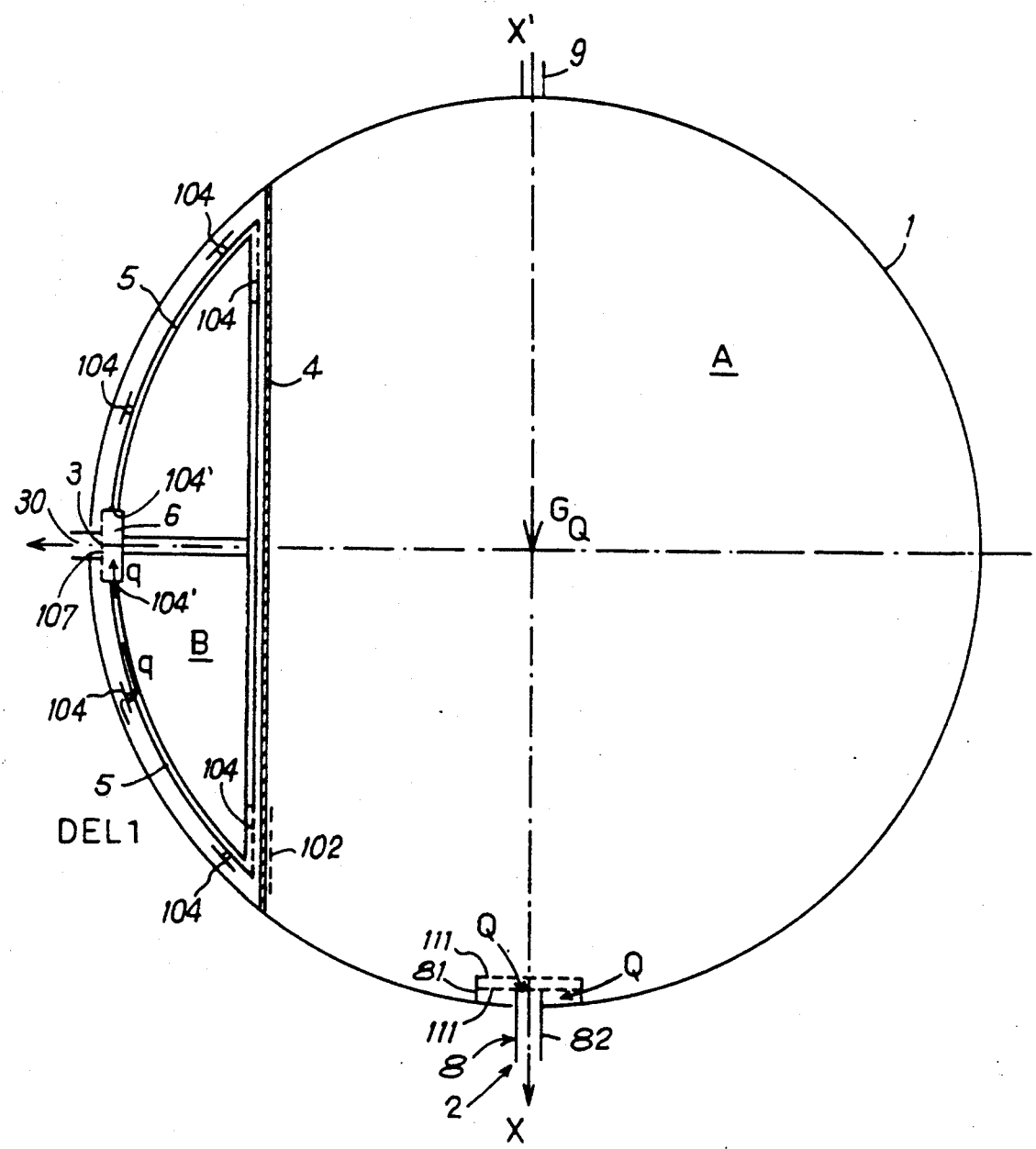
FIGS. 8 to 10 are axial section views through a tank of the invention including a diaphragm extending parallel to the main outlet orifice for use with high liquid flow rates.
Figure 9:
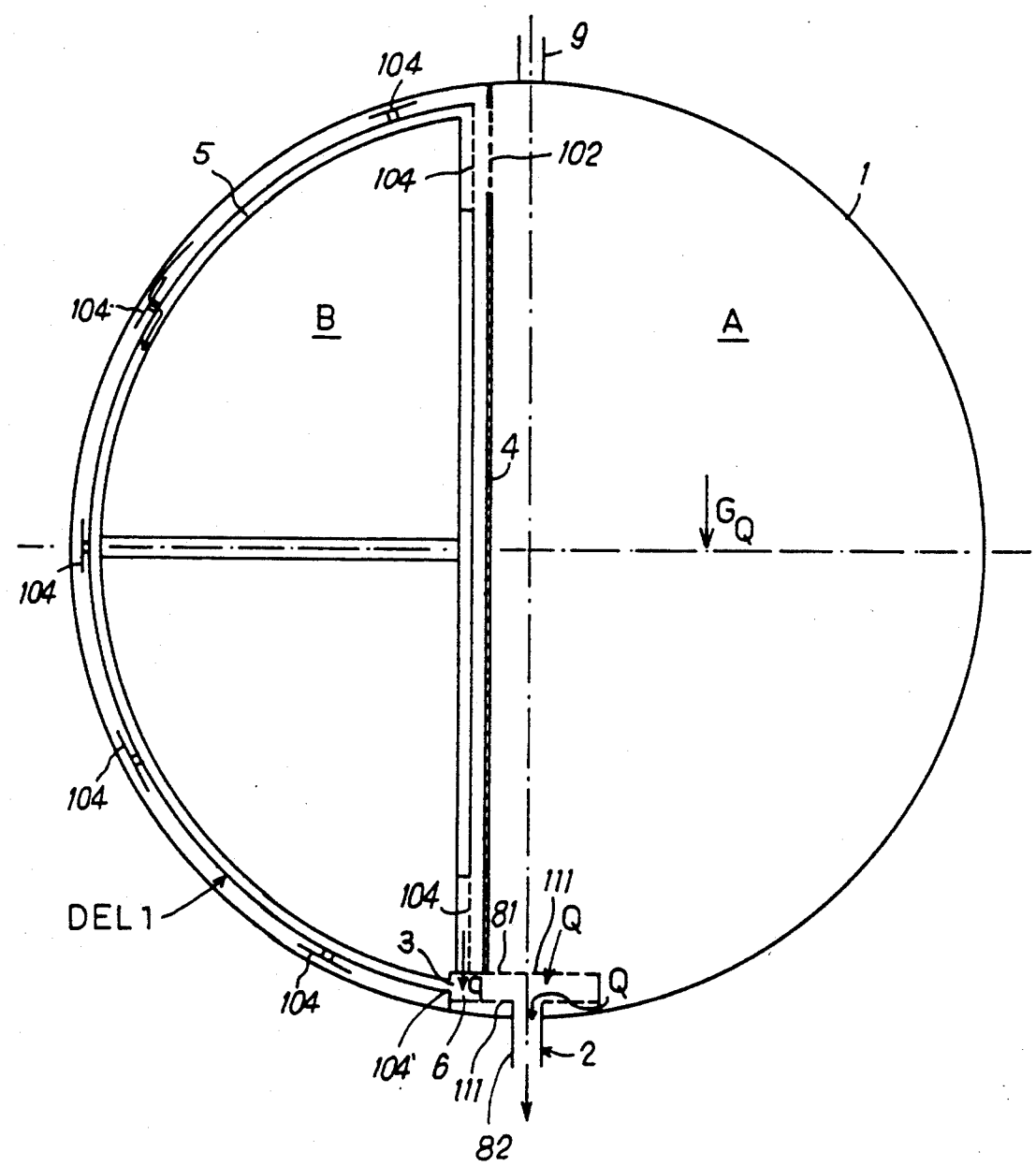
Figure 10:
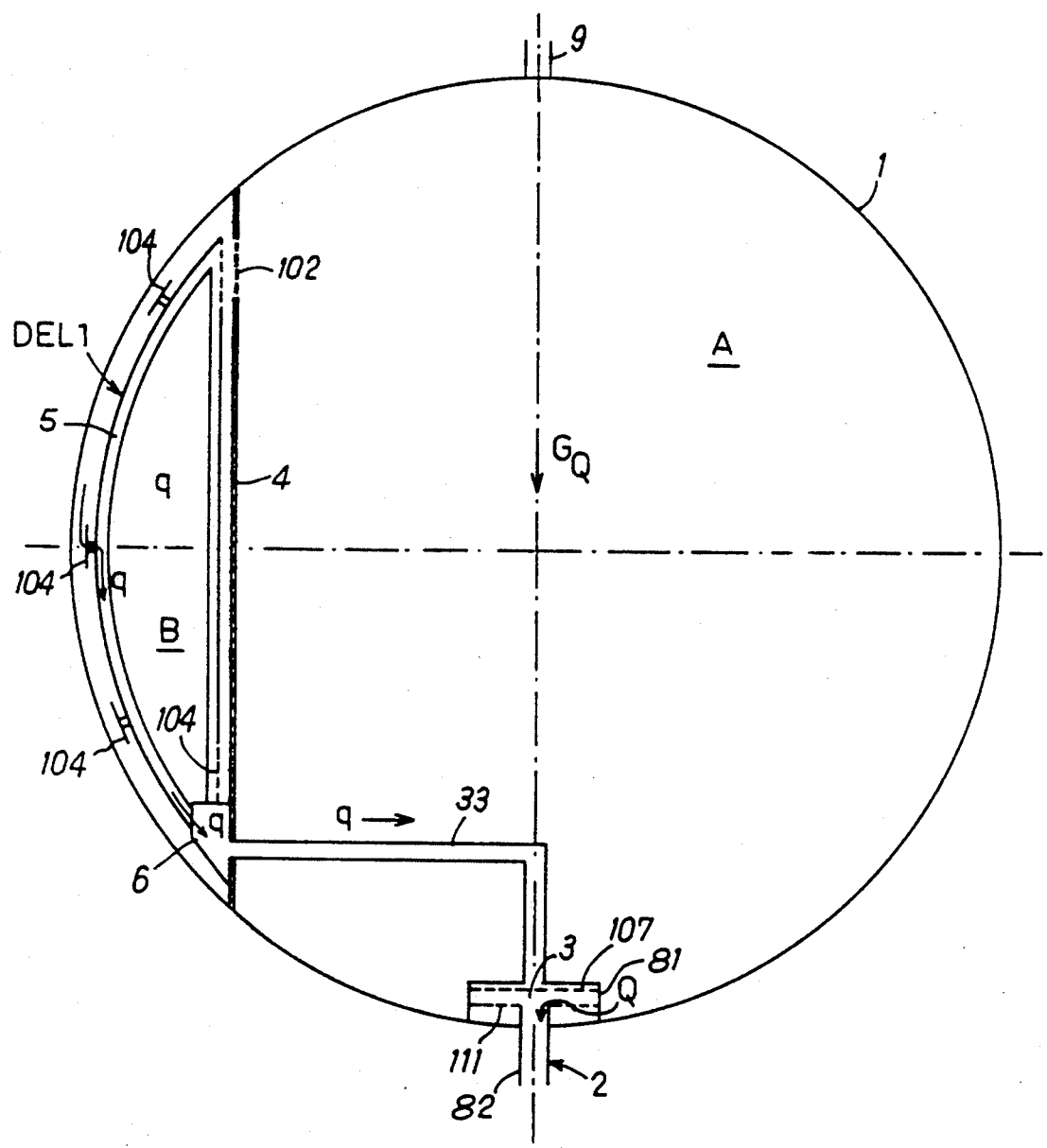

FIGS. 8 to 10 show tanks of the invention having a large compartment A and a small compartment B which are separated by a diaphragm 4 pierced by an orifice receiving a strainer 102 that provides communication between the compartments A and B for pressurization and purging purposes. The liquid expulsion device DEL1 (which may be analogous to the devices described with reference to FIGS. 1 to 7) is disposed in the compartment B.

The embodiments shown in FIGS. 8 to 10 are essentially characterized by the diaphragm 4 being disposed vertically, i.e. parallel to the diametral axis of the tank 1 running from the pressurization orifice 9 to the main outlet zone 2 for high liquid flow rates. Under such circumstances, the diaphragm 4 is thus parallel to the acceleration vector $G_Q$ of the tank when a main engine such as an apogee engine requiring a high flow rate Q is in use.

In FIG. 8, the device 8 for delivering high flow rates Q comprises a receptacle 81 in which outlet strainers 111 are disposed, and an outlet tube 82 which starts within the receptacle 81 and which extends diametrically away from the pressurization orifice 9 parallel to the acceleration direction $G_Q$.

The device for delivering low flow rates q from the compartment B is offset relative to the device 8 for delivering high flow rates, at an angular offset of 90 $\phi$ in the embodiment of FIG. 8, with the outlet tube 30 for low flow rates q being situated level with an outlet passage 3 which is provided with an outlet strainer 107 disposed on the gas trap 6 of the liquid expulsion device DEL1.

In the embodiment of FIG. 9, the high flow rate outlet Q and the low flow rate outlet are brought together diametrically opposite to the pressurization orifice 9. Under such circumstances, where the difference in size between the compartments A and B is relatively small, the outlet zone 3 for small flow rates q from the smaller compartment B is situated inside the receptacle 81 of the device 8 for delivering high flow rates Q as provided with outlet strainers 111. The ends of the liquid expulsion device DEL1 provided with strainers 104' thus open out directly into the receptacle 81 which is in communication with the outlet tube 82.

FIG. 10 shows a variant of FIG. 9 in which the second compartment B is much smaller than the first compartment A.

In this case, the outlet orifices from the liquid expulsion device DEL1 of the compartment B open out into an intermediate collector 6 constituting a gas barrier and connected by a duct 33 to the receptacle 81 which is provided with the outlet strainers 111 for high flow rates Q. The downstream end of the duct 33 constitutes the zone 3 for delivering small flow rates of liquid through an outlet strainer 107, said zone 3 thus being situated inside the receptacle 81 which opens out into the outlet tube 82 for use with large flow rates.

Figure 11:
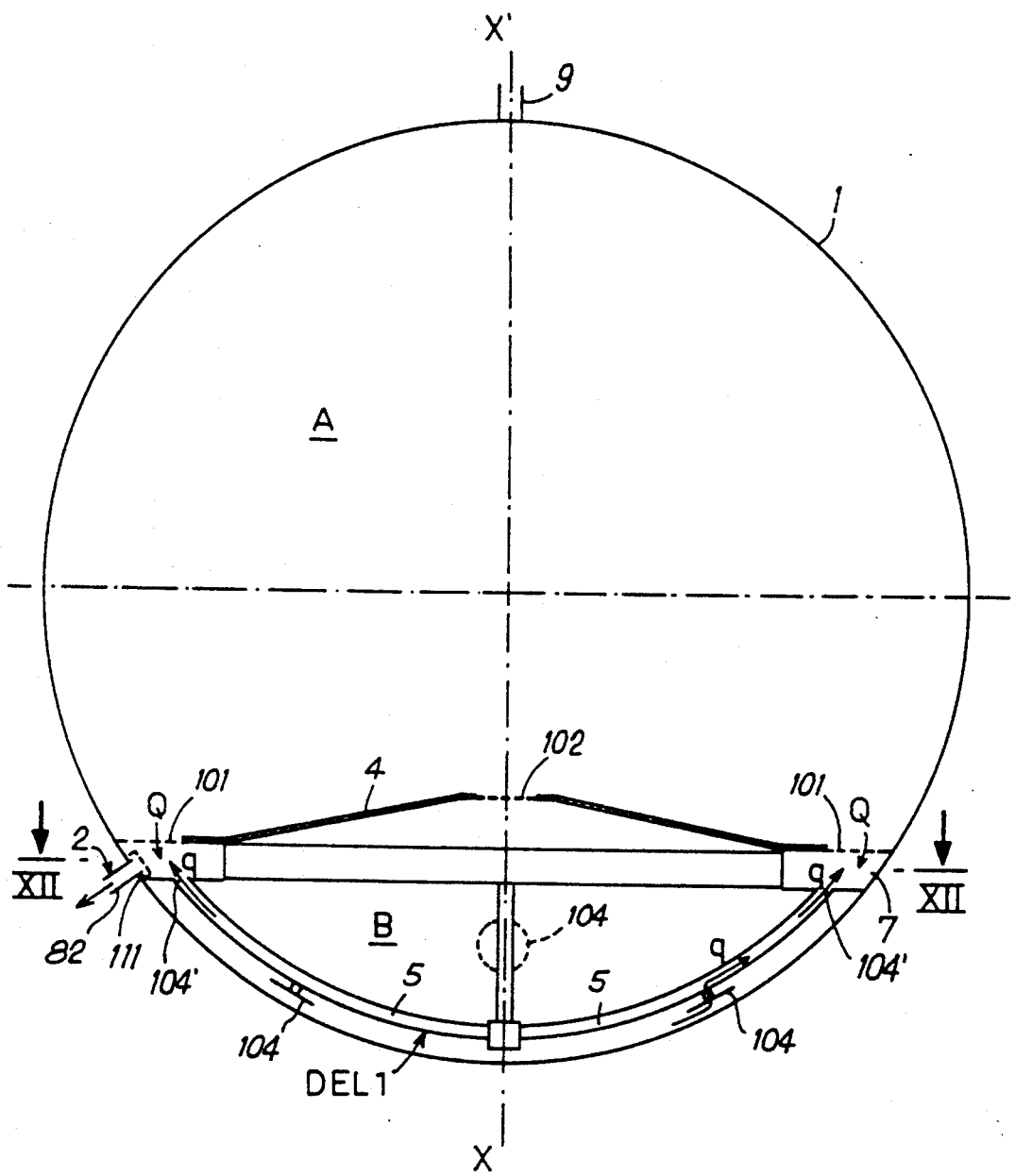
FIG. 11 is an axial section view through a tank of the invention including an annular outlet collector disposed beneath the diaphragm splitting the tank into two compartments.
Figure 12:
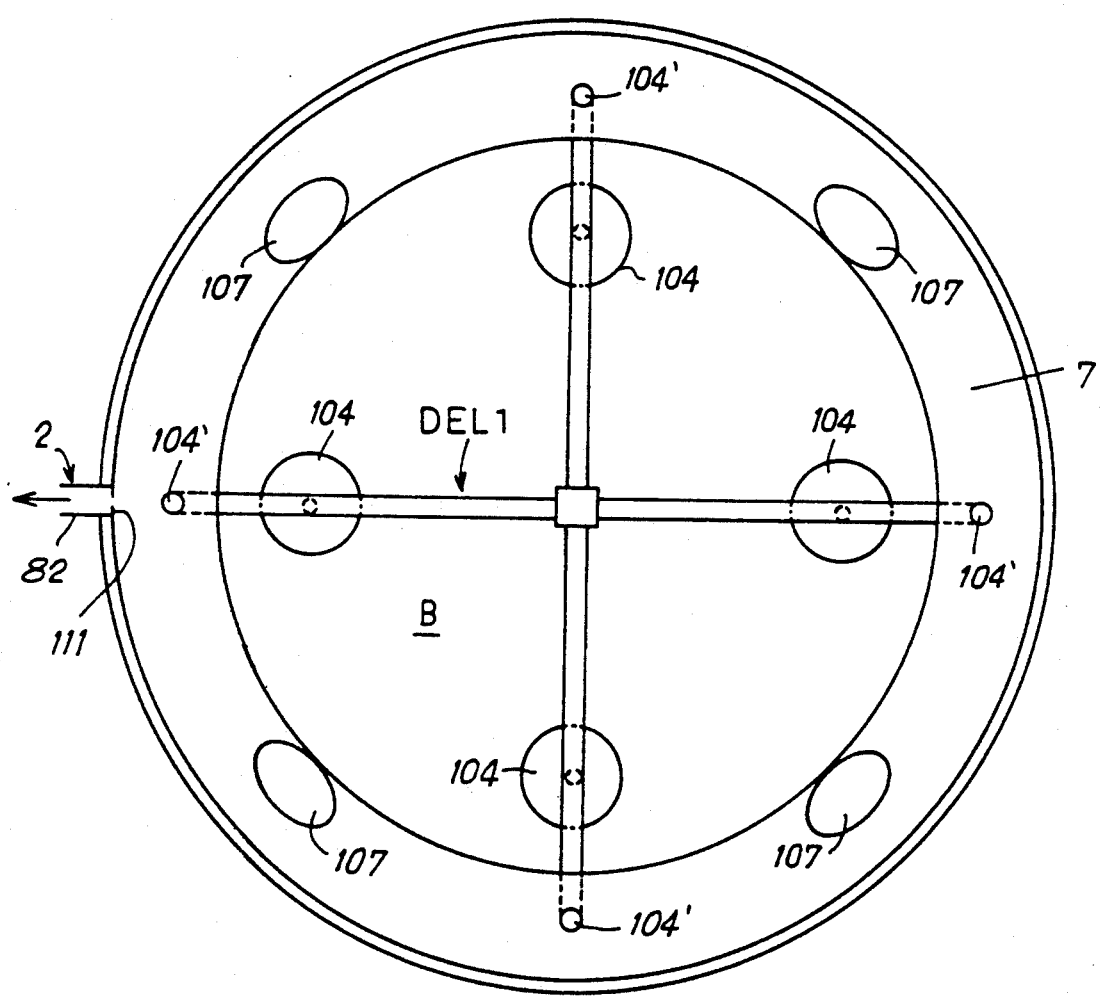
FIG. 12 is a section view on line XII—XII of FIG. 11.

FIGS. 11 and 12 show an embodiment in which an annular collector 7 is disposed beneath the diaphragm 4 which extends essentially perpendicularly to the axis XX', but is preferably frustoconical in shape with its small base directed towards the large compartment A. In this case, the strainer 102 providing communication between the compartments A and B is itself disposed in the central portion of the frustoconical diaphragm 4 at its small base. The conical shape of the diaphragm 4 serves to stiffen it while directing liquid towards its periphery, i.e. towards the annular collector 7. Outlet strainers 101 are disposed in a peripheral zone of the diaphragm 4 to transfer high flow rates of liquid from the compartment A to the collector 7.

The small flow rates q of liquid from the liquid expulsion device DEL1 disposed in the small compartment B open out via strainers 104' into the bottom face of the annular collector 7. Both the low and the high flow rates of liquid are delivered via an outlet strainer 111 disposed in the outside face of the annular collector 7 which opens out into an outlet tube 82 which is slightly offset angularly relative to the axis XX'.

Strainers 107 allow a propellant to pass directly from the compartment B into the annular collector 7. The strainers 107 thus assist the strainers 104 of the liquid expulsion device DEL1.

I claim:

1. A surface tension tank having multiple delivery flow rates, for operation under microgravity in space vehicles or satellites for feeding a main engine and at least one auxiliary receiver or engine with a liquid propellant, the tank comprising a common shell housing at least two compartments of different dimensions which are separated by at least one first diaphragm provided with at least one strainer providing communication between the larger-sized compartment and the smaller-sized compartment, a pressurization gas feed orifice being provided through the shell to open out into the large compartment, a liquid expulsion device being placed in the small compartment, and means for delivering liquid to the members to be fed being essentially disposed in a direction that differs little from the main acceleration direction imparted by the main engine, so that liquid is accelerated therealong, wherein the tank includes means provided with at least one outlet strainer forming a gas barrier for delivering at least a substantial portion of the liquid contained in the large compartment directly to the liquid delivery means without the liquid transiting via the small compartment, such that the tank allows liquid to be taken directly both from the large compartment and from the small compartment, thereby defining a maximum liquid outlet flow rate which may be about 100 times the minimum authorized flow rate.

2. A tank according to claim 1, including a first outlet tube approximately diametrically opposite to the pressurization gas feed orifice and serving to deliver liquid directly from the large compartment.

3. A tank according to claim 2, including a second outlet tube disposed coaxially about the first outlet tube to deliver liquid directly from the small compartment via an annular passage itself provided with a strainer constituting a gas barrier.

4. A tank according to claim 2, wherein the smaller-section first outlet tube opens out into the second outlet tube.

5. A tank according to claim 2, wherein the first and second outlet tubes are connected to independent sets of pipework.

6. A tank according to claim 2, including an outlet passage provided with a strainer constituting a gas barrier for delivering liquid from the small compartment, which outlet passage is offset relative to the first outlet tube and is directly connected to pipework that is independent from the pipework connected to the first outlet tube.

7. A tank according to claim 2, including an outlet passage provided with outlet strainers forming gas barriers and serving to deliver liquid from the small compartment, which outlet passage opens out into a receptacle which is itself in communication with the first outlet tube.

8. A tank according to claim 1, including a first outlet tube for direct delivery of liquid from the large compartment via an annular collector disposed in a boundary zone between the large compartment and the small compartment within the lower fourth of the tank opposite from the pressurization gas feed orifice.

9. A tank according to claim 1, wherein said first diaphragm is essentially situated in a plane perpendicular to the axis of symmetry of the tank, which axis passes through the pressurization gas feed orifice.

10. A tank according to claim 1, wherein said first diaphragm is situated essentially in a plane parallel to an axis of symmetry of the tank, which axis passes through the pressurization gas feed orifice.

11. A tank according to claim 9, wherein the first diaphragm is curved in shape with its convex side facing towards the small compartment.

12. A tank according to claim 8, wherein the first diaphragm is frustoconical in shape with its small base facing towards the large compartment, the strainer providing communication between the large compartment and the small compartment being itself disposed in the central portion of the first diaphragm at the small base.

13. A tank according to claim 2, wherein said first diaphragm is essentially situated in a plane perpendicular to the axis of symmetry of the tank, which axis passes through the pressurization gas feed orifice, and wherein the outlet strainer forming a gas barrier for delivering the liquid contained in the large tank is situated in the central portion of the first diaphragm, while the strainer providing communication between the large compartment and the small compartment is disposed in an annular zone of the first diaphragm situated at a distance from said central portion.

14. A tank according to claim 2, wherein said first diaphragm is situated essentially in a plane parallel to an axis of symmetry of the tank, which axis passes through the pressurization gas feed orifice, and wherein the outlet strainer forming a gas barrier for delivering the liquid contained in the large tank is situated in a collector whose outlet opens out into the first outlet tube, while the strainer providing communication between the large compartment and the small compartment is disposed in the first diaphragm.

15. A tank according to claim 2, wherein said first diaphragm is essentially situated in a plane perpendicular to the axis of symmetry of the tank, which axis passes through the pressurization gas feed orifice, and further comprising a second diaphragm parallel to said first diaphragm, the first and second diaphragms defining between them said small compartment which is provided with a liquid expulsion device, while the second diaphragm together with the end wall of the tank in which the liquid delivery means are disposed also defines an additional compartment of small size having no liquid expulsion device and constituting a priming tank specific to the high flow rate, the second diaphragm being provided with at least one strainer for providing communication between the small compartment and the additional small compartment, and the first outlet tube passing through both the small compartment and the additional small compartment without communicating therewith.

16. A tank according to claim 15, wherein communication tubes having axes perpendicular to said first and second diaphragms are placed between the large compartment and the additional small compartment, and a strainer is placed at at least one of the ends of each of said tubes.

17. A tank according to claim 15, wherein communication tubes extending perpendicularly to said first and second diaphragms are placed between the small compartment and the liquid delivery means, and are provided with strainers forming gas barriers to enable the liquid contained in the small compartment to be delivered directly to the liquid delivery means.

* * * * *